Figure 1:
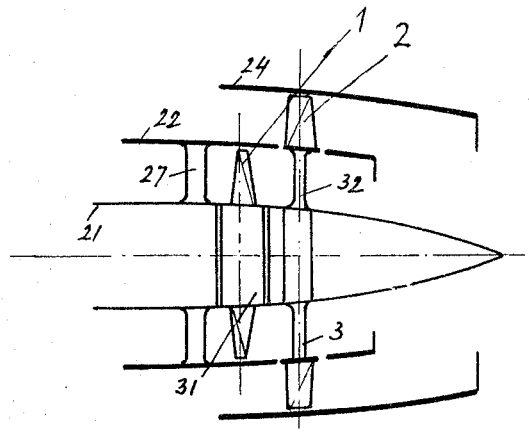

Nov. 1, 1966   W. MESSERSCHMITT   3,282,053
DUCTED FAN ARRANGEMENT FOR AIRCRAFT
Filed Sept. 24, 1964

INVENTOR.
Willy Messerschmitt
BY
Michael J. Striker
Atty

United States Patent Office 3,282,053
Patented Nov. 1, 1966

3,282,053
DUCTED FAN ARRANGEMENT FOR AIRCRAFT
Willy Messerschmitt, Munich, Germany, assignor to Messerschmitt Aktiengesellschaft, Augsburg, Germany
Filed Sept. 24, 1964, Ser. No. 398,942
Claims priority, application Germany, Oct. 2, 1963, M 58,404
11 Claims. (Cl. 60—263)

The present invention relates to a ducted fan arrangement for aircraft, and more particularly to a fan arrangement of the type in which a fan driven by a rotary turbine has vanes located in an annular duct surrounding the turbine.

Aircraft propulsion plants are known in which the vanes of the turbine are driven by combustion gases and carry outwardly projecting secondary vanes located in a bypass duct. Since the secondary vanes necessarily have the same rotary speed as the turbine rotor and outwardly project from the same, the circumferential speed of the secondary vanes is greater than the circumferential speed of the turbine rotor vanes.

The circumferential speed particularly at the outermost points of the secondary vanes must not exceed a certain limit which depends on the centrifugal forces acting on the secondary vanes, and must not be so high as to subject the secondary vanes to excessive forces which they could not withstand, particularly under consideration of the developed heat. Consequently, for a given rotary speed of the turbine, the diameter of the circle along which the outermost portions of the secondary vanes are located must not exceed a predetermined value. Since the diameter of the turbine rotor is given, the radial height of the secondary vane is limited, so that only a certain amount of air can be transported by the secondary vanes through the annular bypass duct in which they are located.

Furthermore, since the secondary vanes rotate at the comparatively high rotary speed of the turbine, the air transported by the secondary vanes is accelerated to very high speed so that substantial percentage of the output power of the turbine is consumed.

It is one object of the invention to overcome this disadvantage of known bypass fan arrangements, and to provide means for moving a predetermined amount of air at a comparatively low speed through the bypass conduit.

Another object of the invention is to prevent the development of excessive centrifugal forces at the outer end of the vanes of the turbine driven fan of an aircraft propulsion system.

Another object of the invention is to provide an aircraft propulsion system with a fan whose vanes have a greater radial length than the corresponding vanes of the conventional propulsion system without being subjected to a greater centrifugal force than the vanes of a fan in a conventional system.

Another object of the invention is to simultaneously increase the amount, and to reduce the speed of air transported through a duct provided in a propulsion plant for an aircraft. Another object of the invention is to rotate the fan which transports air through a duct at a lower speed than the turbine of a propulsion plant for an aircraft.

Another object of the invention is to operate the turbine of a propulsion plant at a very high speed while driving the fan at a lower speed limited by the resistance of the fan vanes against the action of the centrifugal force.

With these objects in view, an arrangement in accordance with one embodiment of the invention comprises a turbine rotor, rotary fan means having vanes located in the duct means, and a reduction transmission connecting the turbine rotor with the fan.

The ratio of the transmission is selected so that the fan is driven at a rotary speed selected in view of the centrifugal forces acting on the fan vanes.

In the preferred embodiment of the invention, the turbine rotor is located in a first duct and drives a coaxial fan through a planetary transmission at a reduced speed. The fan has vanes located in an annular second duct surrounding the first duct so that the diameter of the fan is greater than the diameter of the turbine rotor. Nevertheless, the centrifugal force acting on the fan vanes is not excessive since the rotary speed of the fan is lower than the rotary speed of the turbine rotor which may be driven at the maximum rotary speed permitted by the centrifugal force acting on the turbine rotor vanes. The portions of the fans which are located in the first duct are spokes having such a profile as to cause minimum resistance to the passage of the gases by which the turbine rotor is driven.

Figure 2:
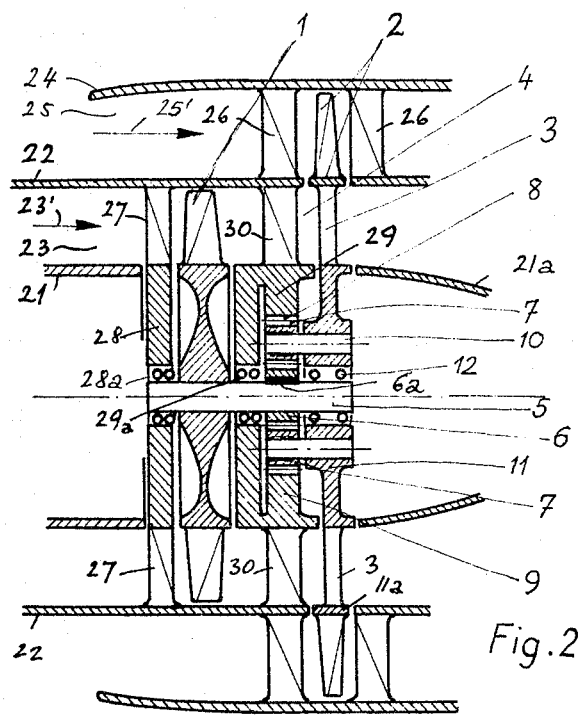

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

FIG. 1 is a fragmentary schematic section illustrating the general arrangement of an aircraft propulsion plant provided with a rotary fan and a bypass duct; and FIG. 2 is a fragmentary sectional view illustrating an embodiment of the invention.

Referring now to the drawing, an inner guide means 21 is surrounded by a tubular wall 22 and forms a first annular duct 23 with the same. An outer tubular wall 24 surrounds tubular wall 22 and forms a second annular duct 25 with the same. Walls 24 and 22 are connected by radial struts in the form of guide vanes 26, and radial guide vanes 27 connect wall 22 with a transverse support plate 28. A supporting member 29 is supported on tubular wall 22 by struts 30 which have such a profile as to offer little resistance to combustion gases flowing in direction of the arrow 23' through duct 23.

Support plate 28 and support member 29 have central openings in which antifriction bearings 28a and 29a are mounted so as to support a shaft 5 to which a turbine rotor 31 is secured. Turbine rotor 31 has a set of radial vanes 1 located in the annular duct 23. It is evident that combustion gases flowing in the direction of the arrow 23' and guided by the stationary guide vanes 27, will cause rotation of turbine rotor 31 together with shaft 5.

A sun gear or pinion 6 is secured by a key 6a to shaft 5 and rotates with the same. The stationary support member 9 has an inner gear crown 8 surrounding pinion 6. A plurality of planetary pinions 7 are located between gears 6 and 8 and in meshing engagement with the same. Planetary gears 7 are freely rotatable on journals 10 which are secured to the inner portion 11 of a fan 32. The inner portion 11 has a diameter corresponding to the diameter of tubular wall 21 and has an outer flange located in the gap between the end of wall 21 and a corresponding wall 21a.

Radial spokes 3, whose profile is selected to offer minimum resistance to the passage of combustion gases through duct 23, project outwardly from portion 11, and carry a ring 11a having the same diameter tubular as wall 22, and being located in a gap of the same. A set of circumferentially spaced fan vanes 2 is mounted on ring 11a outwardly projecting from the same into the annular duct 25 in a position located between the guide vanes 26.

When a stream of combustion gases flows in the direction of the arrow 23' through the annular duct 23, it is guided by guide vanes 26 to the vanes 1 of turbine rotor 31 and rotates the same together with shaft 5 and sun gear 6. Since support member 29 and orbit gear 8 are stationary, planetary gears 7 roll on, and revolve around sun gear 6 while rotating on journals 10. Fan 32 acts as spider or carrier of planetary gears 7, and consequently rotates about shaft 5 at the same rotary speed as the planetary gears revolve about sun gear 6, and consequently the rotary speed of fan 32 is lower than the rotary speed of turbine rotor 31.

The ratio of the planetary transmission is selected in such a manner that the peripheral speed of fan vanes 2 will not result in unduly high centrifugal forces, although turbine rotor 31 may be rotated at the maximum speed at which turbine vanes 1 sustain the centrifugal forces.

In order to move sufficient air in the direction of arrow 25' through the duct 25, the radial extension of fan vanes 2 is greater than comparable construction according to the prior art where the fan rotates at the same speed as the turbine rotor.

By suitably selecting the diameters of orbit gear 8 and sun gear 6, a transmission ratio can be selected at which the optimal values for the amount of transported air, of the centrifugal force, and desirable flow conditions in the ducts are obtained.

The radial height of the fan vanes 2 is in a certain relationship with the ratio of the transmission in order to obtain transportation of the same amount of air through bypass duct 25 at the lower peripheral speed of fan vanes 2 and at the lower speed of the air moving in bypass duct 25, as would be obtained by a fan driven at the same speed as the turbine rotor and moving the air in duct 25 at a correspondingly higher speed in the direction of the arrow 25'.

Suitable sealing means, not shown, are provided to seal duct 23 from duct 25 and the space within walls 21 and 21a.

It will be understood that each of the elements described above or two or more together, may also find a useful application in other types of duct arrangements for propulsion plants of aircraft differing from the types described above.

While the invention has been illustrated and described as embodied in a fan driven through a reduction transmission by a turbine rotor for transporting air through a bypass duct, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. Fan arrangement for an aircraft, comprising, in combination, a plurality of tubular wall means having a common axis and forming an inner annular duct and an outer annular duct, said wall means including stationary tubular wall means between said outer and inner ducts having a narrow annular gap; supporting means secured to said wall means and having an inner part including bearing means located in the region of said axis; a shaft supported in said bearing means for rotation; a turbine rotor carried by said shaft and having radial turbine vanes located in said inner annular duct; fan means mounted for rotation about said axis and having radially extending spokes located in said inner annular duct, a narrow ring secured to the outer ends of said spokes and located in said annular gap flush with said tubular wall, and radial fan vanes projecting from said ring and located in said outer annular duct, said spokes having a profile offering low resistance to the flow of gases through said inner annular duct and causing no propulsion of gases in the same; and reduction transmission means connecting said shaft with said fan means for driving the latter at a selected rotary speed lower than the rotary speed of said turbine rotor so that the centrifugal force acting on said fan vanes does not exceed a predetermined limit.

2. Fan arrangement for an aircraft, comprising, in combination, a plurality of tubular wall means having a common axis and forming an inner annular duct and an outer annular duct, said wall means including stationary tubular wall means between said outer and inner ducts having a narrow annular gap; supporting means secured to said wall means and having an inner part including bearing means located in the region of said axis; a shaft supported in said bearing means for rotation; a turbine rotor carried by said shaft and having radial turbine vanes located in said inner annular duct; fan means mounted for rotation about said axis and having radially extending spokes located in said inner annular duct, a narrow ring secured to the outer ends of said spokes and located in said annular gap flush with said tubular wall, and radial fan vanes projecting from said ring and located in said outer annular duct, said spokes having a profile offering low resistance to the flow of gases through said inner annular duct and causing no propulsion of gases in the same; and reduction transmission means including a sun gear carried by said shaft, an orbit gear carried by said supporting means, a plurality of planetary gears between said orbit gear and said sun gear meshing with the same, and journal means secured to said fan means and supporting said planetary gears for free rotation so that said planetary gears revolve around said sun gear when the same is driven with said shaft by said turbine rotor whereby said fan means is driven at a selected rotary speed lower than the rotary speed of said turbine rotor whereby the centrifugal force acting on said fan vanes does not exceed a predetermined limit.

3. A bypass fan arrangement as set forth in claim 2 and including guide vanes mounted in said outer bypass duct upstream and downstream of said fan vanes.

4. Fan arrangement downstream of a jet propulsion plant for increasing the propelling force, comprising, in combination, a plurality of wall means forming an inner annular duct for combustion gases and an outer annular duct for air, and including tubular wall means between said inner and outer ducts having a narrow annular gap; a turbine rotor having turbine vanes located in said inner annular duct; and fan means including radial spokes located in said inner annular duct and arranged and constructed to offer low resistance to the flow of combustion gases so that no force is transmitted between said spokes and said combustion gases in said inner duct, a narrow ring connecting the outer ends of said spokes and being located in said narrow gap to separate said outer and inner annular ducts, and radial fan vanes secured to said ring and located in said outer annular duct for propelling air in the same; and a reduction transmission including a first transmission means connected with said turbine rotor for rotation and a second transmission means rotating at a lower speed than said first transmission means and driving said fan means at such a rotary speed that the centrifugal force acting on said fan vanes does not exceed a predetermined limit.

5. Fan arrangement downstream of a jet propulsion plant for increasing the propelling force, comprising, in combination, a plurality of wall means forming an inner annular duct for combustion gases and an outer annular duct for air, and including tubular wall means between said inner and outer ducts having an arrow annular gap; a turbine rotor having turbine vanes located in said inner annular duct, and a shaft projecting in downstream direction; and fan means disposed downstream of said turbine rotor and including radial spokes located in said inner annular duct and arranged and constructed to offer low resistance to the flow of combination gases so that no force is transmitted between said spokes and said combustion gases in said inner duct, a narrow ring connecting the outer ends of said spokes and being located in said narrow gap to separate said outer and inner annular ducts, and radial fan vanes secured to said ring and located in said outer annular duct for propelling air in the same; and a reduction transmission including a first transmission means secured to said shaft for rotation and a second transmission means rotating at a lower speed than said first transmission means and secured to said fan means for driving said fan means at such a rotary speed that the centrifugal force acting on said fan vanes does not exceed a predetermined limit.

6. Fan arrangement according to claim 5 wherein said reduction transmission is a differential transmission, and wherein said fan means is mounted on said shaft for free rotation.

7. Fan arrangement according to claim 5 wherein said second transmission means is a part of said fan means.

8. Fan arrangement according to claim 5 wherein said reduction transmission is a differential transmission, wherein said fan means is mounted on said shaft for free rotation; and wherein said second transmission means is a part of said fan means.

9. Fan arrangement downstream of a jet propulsion plant for increasing the propelling force, comprising, in combination, a plurality of tubular wall means having a common axis and forming an inner annular duct and an outer annular duct, and including tubular wall means between said outer and inner ducts having a narrow annular gap; a turbine rotor having turbine vanes located in said inner annular duct, and a shaft projecting in downstream direction; fan means including a center portion mounted for free rotation on said shaft, radial spokes located in said inner annular duct and arranged and constructed to offer low resistance to the flow of combustion gases so that no force is transmitted between said spokes and said combustion gases in said inner duct, a narrow ring connecting the outer ends of said spokes and being located in said narrow gap to separate said outer and inner annular ducts, and radial fan vanes secured to said ring and located in said outer annular duct for propelling air in the same; and a planetary gear transmission including a support located between said central portion of said fan means and said turbine rotor and having a bearing for said shaft, said support having a portion forming an orbit gear concentric with said shaft, a sun gear secured to said shaft in the plane of said orbit gear, planetary gears meshing with said orbit gear and sun gear, and journals supporting said planetary gears for rotation and being secured to said central portion of said fan means for rotating the same at a lower speed than the speed of said rotation of said turbine rotor and said shaft, said lower speed being selected so that the centrifugal force acting on said fan vanes does not exceed a predetermined limit.

10. A fan arrangement according to claim 9 and including another support located upstream of said turbine rotor and having another bearing for supporting said shaft, the peripheral surfaces of said supports bounding a portion of said inner annular duct, each of said supports including outwardly projecting radial guide vanes located upstream and downstream of said turbine vanes in said inner annular duct and being secured to said tubular wall means which is located between said inner and outer ducts.

11. A fan arrangement according to claim 10 and including guide vanes located upstream and downstream of said fan vanes in said outer annular duct.

References Cited by the Examiner

UNITED STATES PATENTS

| 2,404,767 | 7/1946 | Heppner | 60—35.6 |
| 2,438,357 | 3/1948 | Bloomberg | 230—122 |
| 2,488,783 | 11/1949 | Stalker | 60—35.6 |
| 2,505,660 | 4/1950 | Baumann | 60—35.6 |
| 2,541,098 | 2/1951 | Redding | 60—35.6 |
| 2,620,624 | 12/1952 | Wislicenus | 60—35.6 |

FOREIGN PATENTS

| 1,028,513 | 2/1953 | France. |
| 1,094,635 | 12/1954 | France. |
| 767,704 | 5/1953 | Germany. |

MARK NEWMAN, *Primary Examiner.*

D. HART, *Assistant Examiner.*